United States Patent
Mohanty et al.

(10) Patent No.: US 8,130,702 B2
(45) Date of Patent: Mar. 6, 2012

(54) OFDMA BASED COMMUNICATION SYSTEM

(75) Inventors: Shantidev Mohanty, Santa Clara, CA (US); Muthaiah Venkatachalam, Beaverton, OR (US); Puneet Pandoh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 12/006,271

(22) Filed: Dec. 31, 2007

(65) Prior Publication Data

US 2009/0168907 A1 Jul. 2, 2009

(51) Int. Cl.
*G06F 17/00* (2006.01)
(52) U.S. Cl. ...... 370/328; 370/329; 370/330; 455/452.1
(58) Field of Classification Search .................. 370/328
See application file for complete search history.

(56) References Cited

U.S. PATENT DOCUMENTS

| | | | |
|---|---|---|---|
| 6,791,995 B1 * | 9/2004 | Azenkot et al. | 370/436 |
| 7,050,419 B2 | 5/2006 | Azenkot et al. | |
| 2006/0126553 A1 | 6/2006 | Lim et al. | |
| 2007/0298809 A1 * | 12/2007 | So | 455/452.1 |
| 2008/0031190 A1 * | 2/2008 | Bae et al. | 370/329 |
| 2008/0043709 A1 * | 2/2008 | Zhou et al. | 370/348 |

OTHER PUBLICATIONS

Korean Patent Office, Intl. Search Rpt and Written Opinion issued in corresponding PCT Application No. PCT/US2008/085220, Apr. 14, 2009, 12 pgs.

* cited by examiner

*Primary Examiner* — Jeffrey Pwu
*Assistant Examiner* — Sulaiman Nooristany
(74) *Attorney, Agent, or Firm* — Trop, Pruner & Hu, P.C.

(57) ABSTRACT

In an Orthogonal Frequency Division Multiple Access communication system, the location of one- and two-dimensional bursts may be specified by specifying the starting location of the plurality of bursts. The length of a burst may then be determined by subtracting starting locations of successive bursts. In some embodiments, the number of bits needed to specifying the location of bursts may be reduced.

10 Claims, 3 Drawing Sheets

OFDMA BASED COMMUNICATION SYSTEM

BACKGROUND

This generally relates to techniques for continuous modulation of Orthogonal Frequency Division Multiplexing (OFDM) signals.

Many recent digital wireless communication systems (wireless or cable-based systems, for example) use Orthogonal Frequency Division Multiplexing (OFDM) for environments where there is strong interference or multipath reflections.

To increase statistical multiplexing gain, many communication systems assign subsets of OFDM subcarriers to individual users, terminals or electrical devices in both the upstream and downstream directions. In this manner, the data associated with a particular user, terminal or electrical device is modulated via the associated subset of OFDM subcarriers. The resultant OFDM modulated signal is then modulated via an RF carrier signal, and the resultant signal is transmitted over a wireless link. This OFDM modulation technique is commonly called Orthogonal Frequency Division Multiple Access (OFDMA).

DETAILED DESCRIPTION

Figure 1:
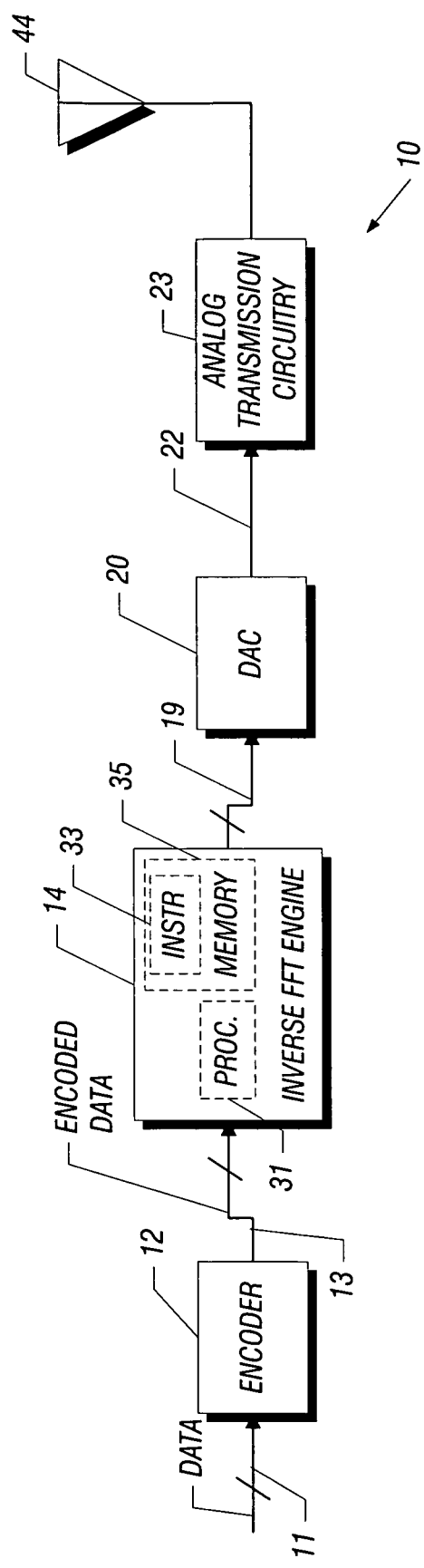
FIG. 1 is a schematic diagram of an OFDMA transmitter according to an embodiment of the invention.

Referring to FIG. 1, an embodiment 10 of an OFDMA transmitter in accordance with one embodiment receives data to be transmitted over a communication link, such as a cable-based or wireless link, as examples. The transmitter 10 may be used as part of a receiver/transmitter pair in a wireless communication system, such as a wireless wide area network (WAN), for example.

As part of the wireless communication system, the transmitter 10 is assigned a subset of OFDM subcarriers for use in transmitting the data over a wireless link to other wireless devices. In this manner, the assigned subset of OFDM subcarriers may be used to communicate data associated with a particular user, terminal or electrical device that is coupled to the pair for purposes of communicating over the wireless link.

Referring to FIG. 1, in operation, an encoder 12 of the transmitter 10 receives data (via communication lines 11) to be transmitted over the wireless link and this data is updated at a predefined sampling rate. The encoder 12 may, for example, introduce an error correcting scheme into the data. The encoder 12 may also perform other operations on the received data, such as a mapping operation, for example. More specifically, the encoder 12 may map the data received by the encoder 12 into a complex value space using quadrature amplitude modulation (QAM). Other and different operations by the encoder 12 are possible.

The encoder 12 provides the encoded data (via communication lines 13) to an Inverse Fast Fourier Transform (IFFT) engine 14 of the transmitter 10. The IFFT engine 14 includes a processor 31 that executes instructions 33 that, in turn, are stored in a memory 35 of the IFFT engine 14. The encoded data may be viewed as being divided into segments, with each segment representing a coefficient that is associated with one of the assigned subcarriers.

The IFFT engine 14 modulates these coefficients with the assigned subcarriers to produce a time-varying digital signal. This digital signal, in turn, is communicated (via communication lines 19) to a digital-to-analog converter (DAC) 20 that converts the digital signal into an analog signal. Analog transmission circuitry 23 subsequently modulates this analog signal with at least one radio frequency (RF) carrier signal and transmits the resultant RF signal by driving an antenna 44 in response to the RF signal.

The digital signal that is produced by the IFFT engine 14 forms the information for OFDM symbols that are indicated by the signal that is transmitted by the antenna 44. In this manner, each basic OFDM symbol is formed from an N point IFFT and has a duration that is equal to a periodic rate at which the OFDM symbols are generated. When viewed in the frequency domain, each basic OFDM symbol includes sinc functions that are located at the frequencies of the OFDM subcarriers.

In an OFDMA based communication system, a frame consists of several OFDM symbols. Each symbol may have multiple sub-carriers that are grouped together to form a sub-channel. Thus, an OFDM symbol may have multiple sub-channels. In a time division duplex (TDD) system, for example, an OFDMA frame may have M symbols and N sub-channels. The OFDMA frame has a downlink (DL) part called as DL sub-frame and an uplink (UL) part known as UL sub-frame. The DL sub-frame starts with a preamble that is used for synchronization followed by Frame Control Header (FCH), which provides frame configuration information. The FCH is followed by downlink MAP (DL-MAP) and uplink MAP (UL-MAP) messages that contain sub-frame allocations and other control information for downlink (DL) and uplink (UL) sub-frames, respectively.

After the preamble, FCH, DL- and UL-MAP the DL sub-frame is divided into different regions containing information for a user or group of users using specific modulation and coding schemes. These regions are referred to as bursts. Similarly, the UL sub-frame contains the UL bursts as specified by UL-MAP.

Parts of the DL and UL sub-frame may not contain any information and are left unused. This may occur when there is not enough traffic to occupy the entire frame. This may also be done intentionally to reduce interference and/or to increase the system performance.

The DL-MAP and UL-MAP specify information about the DL bursts and UL bursts, respectively. This information is specified by using DL MAP information elements (DL-MAP-IEs) and UL MAP information elements (UL-MAP-IEs) in the DL-MAP and UL-MAP, respectively. The DL-MAP-IEs specify the locations of the DL bursts in the DL sub-frame. Similarly, the UL-MAP-IEs specify the locations of the UL bursts in the UL sub-frame.

The dimension of the DL and UL bursts can be one or two. In one dimensional DL and UL bursts, each burst has a start location and a length. On the other hand, a two dimensional burst has a start location, length, and width. The unit of length and width is the minimum amount of resource that can be allocated. This unit is often referred to as one slot. For example, one slot can corresponds to one sub-channel in the frequency axis and one symbol in the symbol axis. In another instance one slot can corresponds to 2 sub-channels in the frequency axis and 3 symbols in the symbol axis. In general one slot is defined as the resource comprising of R sub-channels and S OFDMA symbols where R and S are non-zero integers. However, the invention is applicable irrespective of the exact definition of a slot.

In an OFDMA system, a slot size of one sub-channel versus one OFDMA symbol may be used, and the length of each allocation may be specified in terms of numbers of slots in one embodiment. In other embodiments one slot of an OFDMA system may consist of R number of sub-channels and S number of OFDMA symbols, where R and S are non-zero integers.

Figure 2:
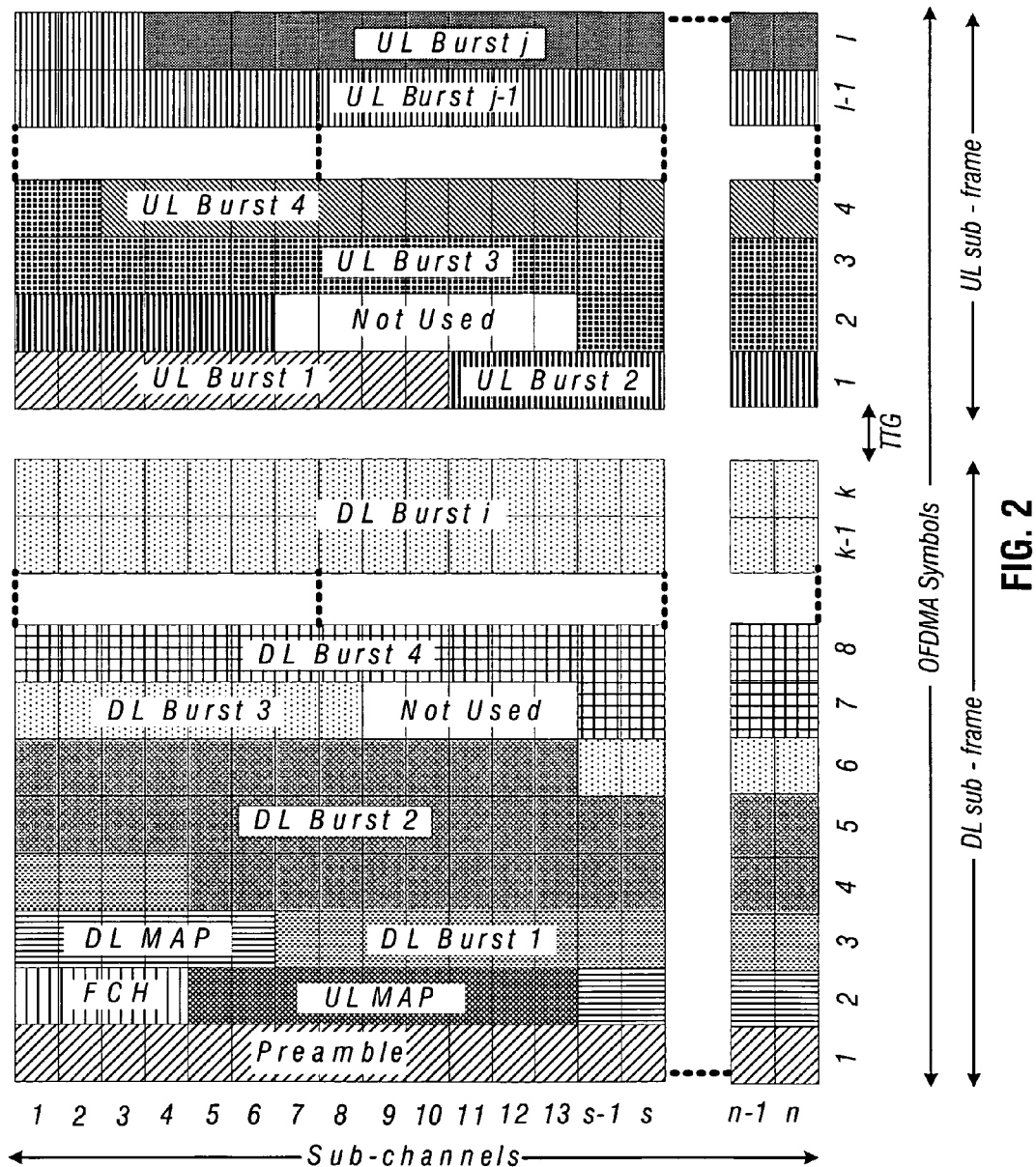
FIG. 2 is a depiction of an OFDMA frame according to an embodiment of the invention.

FIG. 2 shows an example of an OFDMA frame of a TDD system. The OFDMA frame has n sub-channels in the frequency (vertical) axis and m OFDMA symbols in the time (horizontal) axis. It is divided into a DL sub-frame and a UL sub-frame. In the DL sub-frame a base station (BS) is in transmission mode and the mobile stations (MSs) are in the receive mode. On the other hand, during the UL sub-frame the MSs are in transmission mode and the BS is in receive mode. The DL sub-frame and UL sub-frame are separated by an idle time referred to as transmit to receive gap (TTG) when the BS switches from transmission mode to the receive mode and MSs are switched from the receive mode to the transmission mode.

While the duration of the OFDMA frame is constant, the durations of DL sub-frame and UL sub-frame can be determined based on parameters such as the ratio between DL load and UL load. In one example, the DL sub-frame consists of k OFDMA symbols and UL sub-frame consists of l OFDMA symbols such that k+l=m.

Figure 3:
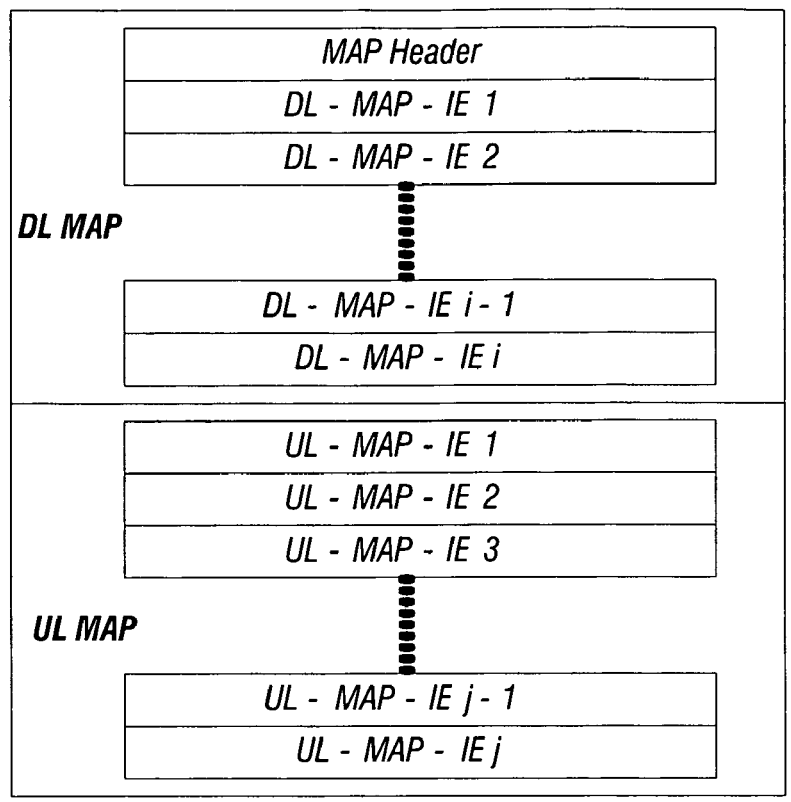
FIG. 3 is a depiction of a DL MAP and UL MAP for one embodiment of the invention.

Along with other information, the DL MAP and UL MAP contain the location information of the DL and UL bursts, respectively. The information about DL and UL bursts are specified in the DL MAP information elements (DL-MAP-IEs) and UL MAP information elements (UL-MAP-IEs), respectively. The structure of DL MAP and UL MAP for uncompressed MAP is shown in FIG. 3 for one embodiment. The structure starts with a MAP header followed by DL-MAP-IEs and then UL-MAP-IEs. In case of a compressed MAP, the MAP header is absent and other parts of the MAP are the same as that of uncompressed MAP. As discussed earlier, the DL-MAP-IEs and UL-MAP-IEs may contain information about the location of the DL bursts and UL bursts, respectively.

Figure 4:
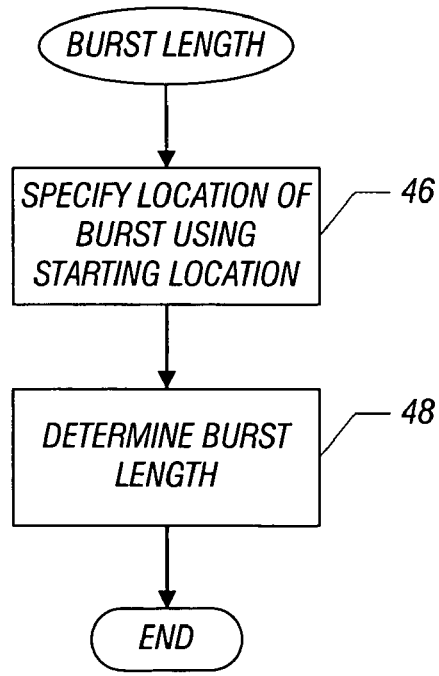
FIG. 4 is a flow chart for one embodiment.

The location of different DL and UL bursts may be specified by using their starting locations, as indicated in FIG. 4 at block 46. The length of a particular DL or UL burst is determined by subtracting the starting location of the corresponding burst from the starting location of the next burst (block 48). The burst length may be determined using hardware, software, or firmware. A software embodiment may be implemented by computer readable code stored on a semiconductor memory, for example. In one embodiment, the software may stored on the inverse FFT engine 14 of FIG. 1, for example, as part of the instructions 33 stored in memory 35.

Referring to FIG. 2, the length of DL burst 1 can be determined by subtracting the starting location of DL burst 1 from the starting location of DL burst 2. Similarly, the length of other bursts can be determined in the same way.

In this case, the location specification of each DL burst has the following format: {DL start location}. Thus, when there are i number of DL bursts, their locations are specified as follows: {DL Start location 1, DL Start location 2, DL Start location 3, . . . , DL Start location i}. Similarly, if there are j number of UL bursts are present, their locations are specified as follows: {UL Start location 1, UL Start location 2, UL Start location 3, . . . , UL Start location j}. The length of a particular DL/UL burst is determined by subtracting the start location of the DL/UL burst from the start location of the next DL/UL burst. For example, the start location of the $5^{th}$ DL burst is determined by subtracting the start location of the $5^{th}$ DL burst from the start location of the $6^{th}$ DL burst. The start location can be specified in either a two co-ordinate system or a one co-ordinate system. In the two co-ordinate system, the starting location is specified in terms of the sub-channel offset and OFDMA symbol offset. In the one co-ordinate system, the starting location is specified in terms of the index of the rectangle in the frame, where each rectangle can be one OFDMA sub-channel versus one OFDMA symbol or one slot. The OFDMA symbol offset in case of the two co-ordinate system and rectangle index in the case of one co-ordinate system can be encoded either on per-frame basis or on per sub-frame basis.

In the two co-ordinance system format, the start location of each burst is specified using the format {start sub-channel offset, start OFDMA symbol offset}.

The number of bits required to encode the sub-channel offset $c_1$ is given by $$c_1 = \lceil \log_2 n \rceil \qquad \text{eq (1)},$$

where n is the number of sub-channels.

The number of bits required to encode the OFDMA symbol offset may depend on two factors. The number of bits depends on whether the OFDMA symbols of DL sub-frame and UL sub-frame are encoded together, referred to as frame-level OFDMA symbol encoding, or separately, referred to as sub-frame-level OFDMA symbol encoding. As the preamble is present in each OFDMA frame, the number of OFDMA symbols used for the preamble can be excluded while determining the OFDMA symbol offset. Thus, the OFDMA symbol offset can be specified either from the beginning of the frame or after the preamble. The former case is referred to as preamble-inclusive OFDMA symbol offset encoding and the latter case is referred to as preamble-exclusive OFDMA symbol offset encoding.

The number of bits required to encode the OFDMA symbol offset varies for the different scenarios is as follows.

If the number of OFDMA symbols used for preamble is p, in case of frame-level OFDMA symbol encoding, the number of bits required to encode the OFDMA symbol offset for preamble-inclusive OFDMA symbol offset encoding and preamble-exclusive OFDMA symbol offset encoding is given, respectively, by $$c_2 = \lceil \log_2 m \rceil \qquad \text{eq (2)},$$

$$c_{2p} = \lceil \log_2 (m-p) \rceil \qquad \text{eq (3)}$$

The number of OFDMA symbols in a DL sub-frame for preamble-inclusive OFDMA symbol offset encoding and preamble-exclusive OFDMA symbol offset encoding is, respectively, k and k-p. Thus, in case of sub-frame-level OFDMA symbol encoding the number of bits required to encode the OFDMA symbol offset field of bursts in DL sub-frame for preamble-inclusive OFDMA symbol offset encoding and preamble-exclusive OFDMA symbol offset encoding is, respectively, given by $$c_{2d} = \lceil \log_2 k \rceil \qquad \text{eq (4)},$$

and $$c_{2dp} = \lceil \log_2 (k-p) \rceil \qquad \text{eq (5)}$$

where k is the number of OFDMA symbols in the DL sub-frames.

The number of bits required to encode the OFDMA symbol offset of bursts in UL sub-frame is independent for preamble-inclusive OFDMA symbol offset encoding and preamble-exclusive OFDMA symbol offset encoding as there is no preamble in the UL sub-frame. The number of bits required to encode the OFDMA symbol offset of bursts in UL sub-frame is given by $$c_{2u} = \lceil \log_2 l \rceil \quad \text{eq (6)},$$

where l is the number of OFDMA symbols in the UL sub-frames, such that k+1=m where m is the number of OFDMA frame in a frame.

The number of bits required for the sub-channel offset and OFDMA symbol offset for two co-ordinate system format is summarized as follows:

| Encoding scheme | | Sub-channel offset (bits) | OFDMA symbol offset in DL sub-frame (bits) | OFDMA symbol offset in UL sub-frame (bits) |
|---|---|---|---|---|
| Frame-level OFDMA symbol encoding | Preamble-inclusive OFDMA symbol offset encoding | $c_1$ | $c_2$ | $c_2$ |
| | Preamble-exclusive OFDMA symbol offset encoding | $c_1$ | $c_{2p}$ | $c_{2p}$ |
| Sub-frame-level OFDMA symbol encoding | Preamble-inclusive OFDMA symbol offset encoding | $c_1$ | $c_{2d}$ | $c_{2u}$ |
| | Preamble-exclusive OFDMA symbol offset encoding | $c_1$ | $c_{2dp}$ | $c_{2u}$ |

In the one co-ordinate system format, the start location of each burst is specified by the index of the rectangle where the burst starts. The index of the start location rectangle is determined as follows for different encoding methods.

In frame-level encoding, the encoding can be preamble-inclusive or preamble-exclusive. In the preamble-inclusive case, the total number of rectangles in the frame is N1=mn. These rectangles can be indexed as 1, 2, ..., mn. Thus, the number of bits required to encode the index of each rectangle is given by $$c_3 = \lceil \log_2 mn \rceil \quad \text{eq (7)}.$$

Similarly, the number of bits required to encode the index of each rectangle in the preamble-exclusive scenario is given by $c_{3p}$ $$c_{3p} = \lceil \log_2(m-p)n \rceil \quad \text{eq (8)}$$

In sub-frame-level encoding, the number of bits required to encode the index of each DL sub-frame rectangle in preamble-inclusive and preamble-exclusive scenarios is given by $c_{3d}$ in eq (9) and $c_{3dp}$ in eq (10).

$$c_{3d} = \lceil \log_2 kn \rceil \quad \text{eq (9)}.$$

$$c_{3dp} = \lceil \log_2(k-p)n \rceil \quad \text{eq (10)}$$

The number of bits required to encode the index of each UL sub-frame rectangle in both preamble-inclusive and preamble-exclusive scenarios is given by $c_{3U}$ in eq (11).

$$c_{3u} = \lceil \log_2(l)(n) \rceil \quad \text{eq (11)}$$

The number of bits required for the sub-channel offset and OFDMA symbol offset for two co-ordinate system format is summarized as follows:

| Encoding scheme | | Rectangle index in DL sub-frame (bits) | Rectangle index in UL sub-frame (bits) |
|---|---|---|---|
| Frame-level OFDMA symbol encoding | Preamble-inclusive OFDMA symbol offset encoding | $c_3$ | $c_3$ |
| | Preamble-exclusive OFDMA symbol offset encoding | $c_{3p}$ | $c_{3p}$ |
| Sub-frame-level OFDMA symbol encoding | Preamble-inclusive OFDMA symbol offset encoding | $c_{3d}$ | $c_{3u}$ |
| | Preamble-exclusive OFDMA symbol offset encoding | $c_{3dp}$ | $c_{3u}$ |

Although, a TDD system is considered to illustrate the invention, the present invention is also applicable to frequency division duplex (FDD) as well as hybrid frequency division duplex (HFDD) systems.

The dimension of one slot is considered as one OFDMA symbol and one sub-channel in the above description. However, in other embodiments, the dimension of a slot may consist of multiple OFDMA symbols and/or multiple sub-channels. Thus, the present scope is not limited by the actual dimension of a slot. When a slot consists of multiple OFDMA symbols and/or multiple sub-channels, the units of the fields of two co-ordinate system format consists of multiple OFDMA symbols and/or sub-channels. Similarly, when a slot consists of multiple OFDMA symbols and/or multiple sub-channels, each rectangle used as indexing in case of one co-ordinate system consists of one slot.

The term "DL burst" refers to a part of DL sub-frame or the complete DL sub-frame of a communication system. The actual definition of DL burst may vary from one standard to another. However, the concepts described herein are applicable irrespective of the actual definition of the DL burst or related terms. In general, the concepts are applicable as long as the medium access control (MAC) packet data units (PDUS) or data for different subscriber stations are located in a specific region or in the entire DL sub-frame of a communication system. These specific regions can be referred to as bursts in a general sense.

The starting location based method may use a lower number of average bits to specify the locations of bursts in the DL and UL sub-bursts in some embodiments. The starting location based method may be reliable because, when the starting location of one DL/UL burst is received incorrectly by a subscriber station, then the location information of only two bursts are received erroneously. These two bursts are one burst whose starting location is received incorrectly, as well as another burst which is prior to the one burst.

This scenario can be clarified by the following example: Assume that are there 6 DL and UL bursts in a frame and their starting locations are as follows: {S1, S2, S3, S4, S5, S6}. If S3 is received incorrectly by a subscriber station, then length of the second burst=S3−S2 is erroneous. In addition, the starting location of the third burst, S3 as well the length of the third burst=S4−S3 are also erroneous. Thus, the location information of the second and third bursts is erroneous. The location information of all other bursts is received correctly.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining in a computer whether a starting location is specified in terms of a one or a two coordinate system;
   if the starting location is specified in a two coordinate system, determining in a computer the starting location from sub-channel offset and OFDMA symbol offset;
   if the starting location is specified in a one coordinate system, determining in a computer the starting location from an index of a rectangle of a frame;
   specifying the location of a burst in a computer using the starting location of said burst; and
   determining the length of a burst in a computer by subtracting the starting location of one burst from the starting location of another burst.

2. The method of claim 1 wherein specifying the location of a burst includes specifying the location of a burst that is a part of a frame of a communication system.

3. The method of claim 1 including specifying the starting location in terms the index of a rectangle of a frame where each rectangle is one sub-channel versus one symbol.

4. The method of claim 1 including specifying the starting location in terms of the index of a rectangle of a frame where each frame is one sub-channel versus one slot that comprises m number of OFDMA symbols and n number of OFDMA sub-channels, where m and n are integers.

5. The method of claim 3 including encoding the rectangle index on a per frame basis.

6. The method of claim 3 including encoding the rectangle index on a per sub-frame basis.

7. The method of claim 1 including encoding the symbol offset on a per frame basis.

8. The method of claim 1 including encoding the symbol offset on a per sub-frame basis.

9. An apparatus comprising:
   a fast Fourier transfer engine;
   an encoder coupled to said engine; and
   a memory storing instructions to specify the location of a burst, determine whether a starting location is specified in terms of a one or a two coordinate system, if the starting location is specified in a two coordinate system, determine the starting location from sub-channel offset and OFDMA symbol offset, if the starting location is specified in a one coordinate system, determine the starting location from an index of a rectangle of a frame, using a starting location of the burst and to determine the length of the burst by subtracting the starting location of one burst from the starting location of another burst.

10. The apparatus of claim 9 in an orthogonal frequency division multiple access system.

\* \* \* \* \*